United States Patent
Tong et al.

(10) Patent No.: US 8,806,234 B2
(45) Date of Patent: Aug. 12, 2014

(54) MOTHERBOARD HAVING TIME DELAY CIRCUIT FOR DELAYING PSON SIGNAL

(75) Inventors: Song-Lin Tong, Guangdong (CN); Qi-Yan Luo, Guangdong (CN); Peng Chen, Guangdong (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 428 days.

(21) Appl. No.: 13/049,909

(22) Filed: Mar. 17, 2011

(65) Prior Publication Data

US 2012/0179930 A1 Jul. 12, 2012

(30) Foreign Application Priority Data

Jan. 8, 2011 (CN) .......................... 2011 1 0002987

(51) Int. Cl.
*G06F 1/26* (2006.01)

(52) U.S. Cl.
USPC ........... 713/300; 713/330; 327/142; 327/143; 327/198; 381/94.1; 381/94.5; 381/120

(58) Field of Classification Search
USPC .................. 713/300, 330; 327/142, 143, 198; 381/94.1, 94.5, 120
See application file for complete search history.

(56) References Cited

U.S. PATENT DOCUMENTS

| | | | | |
|---|---|---|---|---|
| 5,488,258 | A * | 1/1996 | Honda | 307/64 |
| 5,514,946 | A * | 5/1996 | Lin et al. | 702/63 |
| 5,539,298 | A * | 7/1996 | Perkins et al. | 320/139 |
| 6,573,768 | B2 * | 6/2003 | Hwang | 327/143 |
| 6,792,553 | B2 * | 9/2004 | Mar et al. | 713/330 |
| 6,968,465 | B2 * | 11/2005 | Freevol et al. | 713/300 |
| 7,895,426 | B2 * | 2/2011 | Holm et al. | 713/1 |
| 2010/0301908 | A1 * | 12/2010 | Chen | 327/143 |

* cited by examiner

*Primary Examiner* — M Elamin
(74) *Attorney, Agent, or Firm* — Novak Druce Connolly Bove + Quigg LLP

(57) ABSTRACT

A motherboard includes a motherboard power supply connector and a time delay circuit. The motherboard power supply connector connects a power supply unit. The motherboard power supply connector has a power supply on pin and a power good pin. The power good pin is configured for receiving a power good signal from the power supply unit. The time delay circuit has an input terminal and an output terminal. The input terminal is configured for receiving a power supply on signal. The output terminal is connected to the power supply on pin and is configured for sending the power supply on signal to the power supply on pin after a time delay determined by the time delay circuit.

6 Claims, 2 Drawing Sheets

FIG. 2

MOTHERBOARD HAVING TIME DELAY CIRCUIT FOR DELAYING PSON SIGNAL

BACKGROUND

1. Technical Field

The present disclosure relates to motherboards having a time delay circuit for delaying a power supply on (PSON) signal.

2. Description of Related Art

In a computer system, the micro ATX and ATX specifications recommend a 24-pin main connector interface for power supply. This interface incorporates standard +5V, +12V, 3.3V, 5V standby, and soft-power signals. Proper implementation of PSON#, 5VSB, and PW-OK is required for an ATX-compliant power supply.

PSON# is an active low Transistor-Transistor Logic (TTL) signal that turns on all of the main power rails including 3.3V, 5V, –5V, 12V, and –12V power rails. When this signal is held high by the PC board or left open-circuited, outputs of the power rails should not deliver current and should be held at a zero potential with respect to ground. Power should be delivered to the rails only if the PSON# signal is held at ground potential.

Sometimes, the power button of the computer system is triggered repeatedly in a very short time interval, and the power rails of the power supply do not have time to power down fully, which may cause power up sequence failure.

Therefore, a motherboard having a circuit for delaying the PSON signal to prevent the above described power up/down failure is desired.

BRIEF DESCRIPTION OF THE DRAWINGS

FIG. 2 illustrates a circuit diagram of the motherboard of FIG. 1.

DETAILED DESCRIPTION

Figure 1:
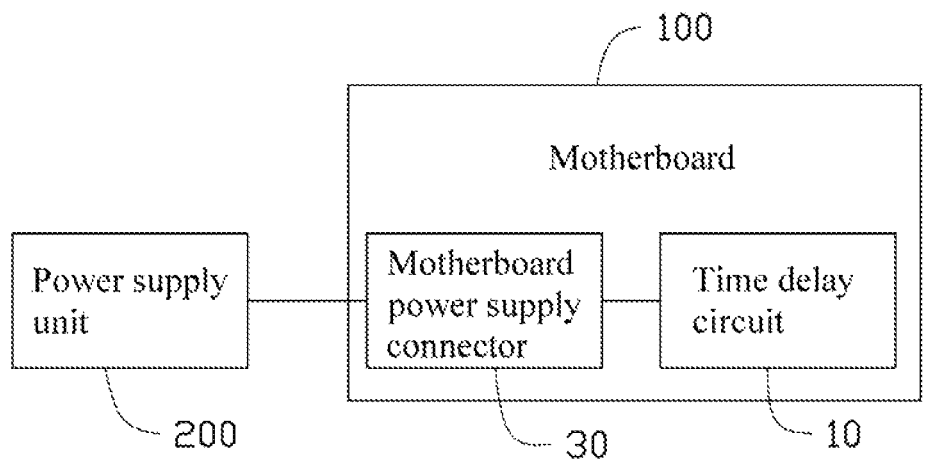
FIG. 1 illustrates a block diagram of a motherboard according to an exemplary embodiment, showing the motherboard connected to a power supply unit.
Figure 2:
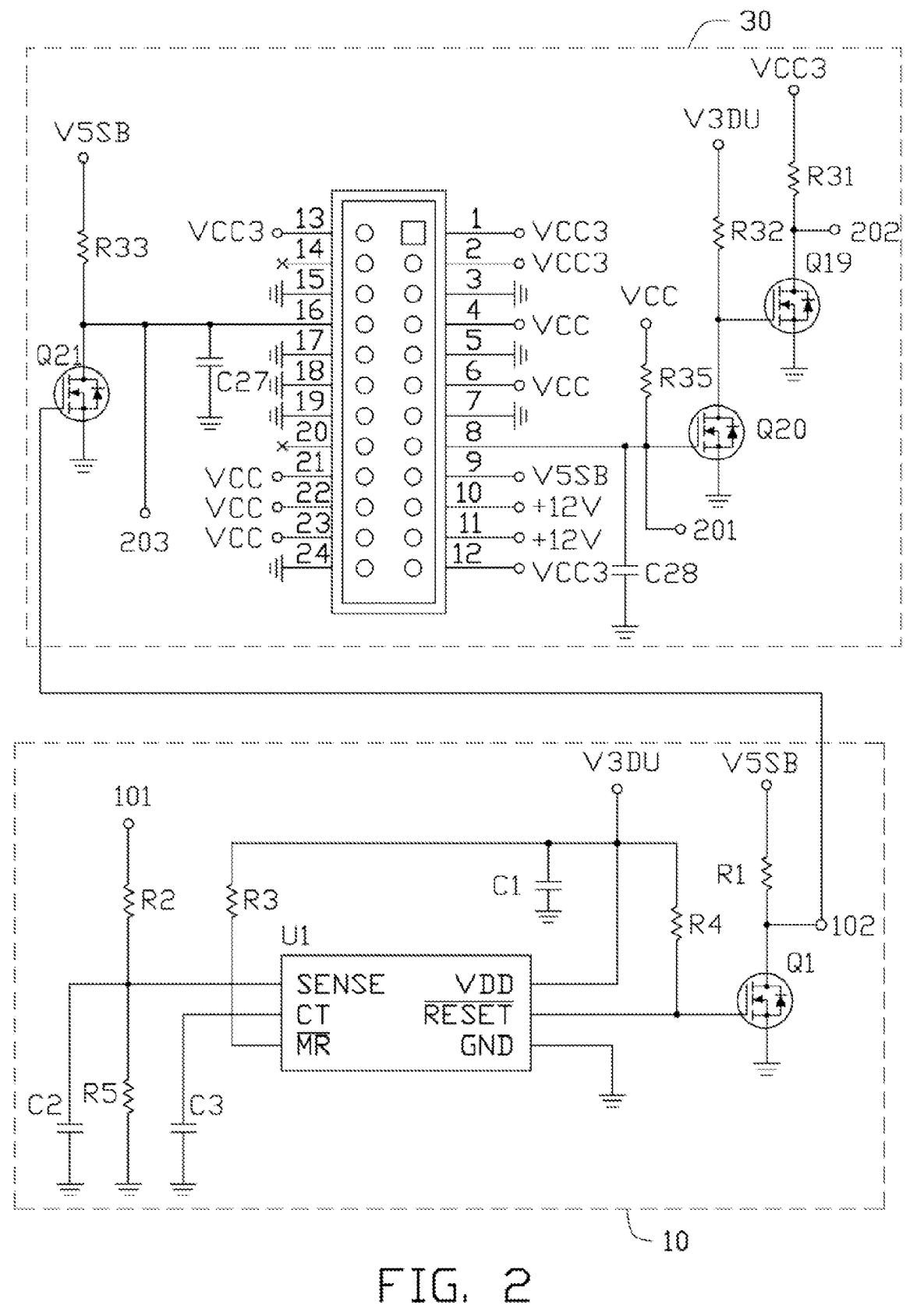

Referring to FIGS. 1 and 2, a motherboard 100, according to an exemplary embodiment, includes a time delay circuit 10 and a motherboard power supply connector 30. The motherboard power supply connector 30 is connected to a power supply unit 200. The power supply unit 200, such as an ATX power supply unit, provides voltages to work the motherboard 100.

The time delay circuit 10 has an input terminal 101 configured for receiving a power supply on (PSON#) signal from the motherboard 100. The PSON# signal is retrieved from a Super I/O of the motherboard 100. The time delay circuit 10 has an output terminal 102 connected to the motherboard power supply connector 30.

In this embodiment, the time delay circuit 10 includes a time delay chip U1, an electrical switch Q1, resistors R1-R5 and capacitors C1-C3. Pin function descriptions of the time delay chip U1 are listed in the following table.

| Pin No. | Mnemonic | Description |
| --- | --- | --- |
| 1 | VDD | Supply voltage. |
| 2 | $\overline{\text{RESET}}$ | $\overline{\text{RESET}}$ is an open drain output that is driven to a low impedance state when $\overline{\text{RESET}}$ is asserted (either the SENSE input is lower than the threshold voltage (VIT) or the $\overline{\text{MR}}$ pin is set to a logic low). |
| 3 | GND | Ground. |
| 4 | SENSE | This pin is connected to the voltage to be monitored. If the voltage at this terminal drops below the threshold voltage VIT, then $\overline{\text{RESET}}$ is asserted. |
| 5 | CT | Reset period programming pin. Connecting this pin to a ground referenced capacitor ≥100 pF gives a user-programmable delay time. |
| 6 | $\overline{\text{MR}}$ | Manual reset pin. Driving the manual reset pin ($\overline{\text{MR}}$) low asserts $\overline{\text{RESET}}$. |

The capacitor C2 and the resistor R5 are connected in series and are both grounded. The SENSE pin is connected to a first node between the capacitor C2 and the resistor R5 and is connected to the input terminal 101 of the time delay circuit 10 via the first node and the resistor R2 to receive the PSON# signal.

The VDD pin is connected to a power supply terminal V3DU. The GND pin is grounded. The $\overline{\text{MR}}$ pin is connected to ground via the resistor R3 and the capacitor C1 in series in that order. The power supply terminal V3DU is connected to a second node between the resistor R3 and the capacitor C1. The $\overline{\text{RESET}}$ pin is connected to a control terminal of the electrical switch Q1. The resistor R4 is connected between a third node and the power supply terminal V3DU. The third node is between the control terminal of the electrical switch Q1 and the $\overline{\text{RESET}}$ pin. The CT pin is grounded via the capacitor C3. A relationship between the capacitance C of the capacitor C3 and the time delay T is characterized by the following equation: $C=(T-0.5\times0.001)\times175$, where a unit of the capacitance C is nanofarad (nF) and a unit of the time delay T is second. Generally, the time delay T is set to be greater than 0.5 seconds. For example, C=150 nF, and T=C/175+0.5×0.001=150/175+0.5×0.001=0.858(s).

The control terminal of the electrical switch Q1 is connected to the $\overline{\text{RESET}}$ pin. A first terminal of the electrical switch Q1 is grounded. A second terminal of the electrical switch Q1 is connected to a standby power supply terminal V5SB via the resistor R1. The output terminal 102 of the time delay circuit 10 is connected to a fourth node between the second terminal of the electrical switch Q1 and the resistor R1.

In this embodiment, the motherboard power supply connector 30 has 24 pins for respectively connecting to a connector of the power supply unit 200. Pin function descriptions of the motherboard power supply connector 30 are listed in the following table.

| Pin No. | Description |
| --- | --- |
| 1 | +3.3 V power supply pin |
| 2 | +3.3 V power supply pin |
| 3 | ground pin |
| 4 | +5 V power supply pin |
| 5 | ground pin |
| 6 | +5 V power supply pin |
| 7 | ground pin |
| 8 | power good (PWRGD#) pin |
| 9 | +5 V standby power supply pin |
| 10 | +12 V power supply pin |
| 11 | +12 V power supply pin |
| 12 | +3.3 V power supply pin |
| 13 | +3.3 V power supply pin |
| 14 | null |
| 15 | ground pin |
| 16 | PSON# pin |

-continued

| Pin No. | Description |
| --- | --- |
| 17 | ground pin |
| 18 | ground pin |
| 19 | ground pin |
| 20 | null |
| 21 | +5 V power supply pin |
| 22 | +5 V power supply pin |
| 23 | +5 V power supply pin |
| 24 | ground pin |

The No. 16 pin is the PSON# pin of the motherboard power supply connector 30 (hereinafter the PSON# pin 16). The No. 8 pin is the PWRGD# pin of the motherboard power supply connector 30 (hereinafter the PWRGD# pin 8).

The motherboard power supply connector 30 further includes a first electrical switch Q21, a second electrical switch Q20, a third electrical switch Q19, resistors R33, R35, R32 and R31, and capacitors C27 and C28. A control terminal of the first electrical switch Q21 is connected to the output terminal 102 of the time delay circuit 10. A first terminal of the first electrical switch Q21 is grounded. A second terminal of the first electrical switch Q21 is connected to the power supply terminal V5SB via the resistor R33. The PSON# pin 16 is connected to a fifth node between the second terminal of the first electrical switch Q21 and the resistor R33.

A control terminal of the second electrical switch Q20 is grounded via the capacitor C28. The PWRGD# pin 8 is connected to a sixth node between the control terminal of the second electrical switch Q20 and the capacitor C28. The PWRGD# pin 8 is connected to a power supply terminal VCC via the sixth node and the resistor R35 in that order, in series. The control terminal of the second electrical switch Q20 is connected to the power supply terminal VCC via the resistor R35. A first terminal of the second electrical switch Q20 is grounded. A second terminal of the second electrical switch Q20 is connected to the power supply terminal V3DU via the resistor 32. A control terminal of the third electrical switch Q19 is connected to a seventh node between the second terminal of the second electrical switch Q20 and the resistor R32. A first terminal of the third electrical switch Q19 is grounded. A second terminal of the third electrical switch Q19 is connected to a power supply terminal VCC3 via the resistor R31. A PWRGD# terminal 201 of the motherboard power supply connector 30 is connected to the PWRGD# pin 8. A system activation signal terminal 202 of the motherboard power supply connector 30 is connected to an eighth node between the resistor R31 and the second terminal of the third electrical switch Q1. The system activation signal is converted from the PWRGD# signal and is configured for activating other electronic components, such as a central processing unit or a hard disk drive, in a computer system.

The motherboard power supply connector 30 includes a monitoring terminal 203. The monitoring terminal 203 is connected between the fifth node and the PSON# pin 16. The fifth node is between the second terminal of the first electrical switch Q21 and the resistor R33. In this way, if the PSON# signal is generated because of computer fault under the condition of the power button of the computer system not being triggered, the motherboard 100 is capable of preventing undesirable power-on of the motherboard 100.

When the power button of the computer system is triggered, the motherboard 100 generates a low level PSON# signal. The PSON# signal is outputted to the input terminal 101 of the time delay circuit 10. The time delay circuit 10 can delay outputting the PSON# signal to the PSON# pin 16 of the motherboard power supply connector 30 in the pre-set time. Thus, power rails of the power supply unit 200 have enough time to power down fully before the arrival of the PSON# signal which turns on the power rails. Therefore the computer system can be normally responsive to the power on (low level PSON# signal) signal and power up failure is prevented.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A motherboard, comprising:
a motherboard power supply connector configured for connecting a power supply unit, the motherboard power supply connector having a power supply on pin and a power good pin, the power good pin configured for receiving a power good signal from the power supply unit; and
a time delay circuit having an input terminal configured for receiving a power supply on signal and an output terminal, the output terminal connected to the power supply on pin and configured for sending the power supply on signal to the power supply on pin after a time delay determined by the time delay circuit, the time delay circuit comprising a time delay chip and a capacitor, the time delay chip having an input pin configured for receiving the power supply on signal, an output pin connected to the power supply on pin, and a reset period programming pin grounded via the capacitor, and a relationship between the value of a time delay T of the time delay chip and a capacitance C of the capacitor being characterized by the following equation: $C=(T-0.5\times 0.001)\times 175$, where a unit of the capacitance C is nanofarad and a unit of the time delay T is second.

2. The motherboard of claim 1, wherein the time delay circuit further comprises a first electrical switch, a control terminal of the first electrical switch is connected to the output pin, a first terminal of the first electrical switch is grounded, and a second terminal of the first electrical switch is connected to the output terminal of the time delay circuit.

3. The motherboard of claim 2, wherein the motherboard power supply connector comprises a second electrical switch, a control terminal of the second electrical switch is connected to the output terminal of the time delay circuit, a first terminal of the second electrical switch is grounded, and a second terminal of the second electrical switch is connected to the power supply on pin.

4. The motherboard of claim 3, wherein the motherboard power supply connector further comprises a third electrical switch and a fourth electrical switch, a control terminal of the third electrical switch is connected to the power good pin, a first terminal of the third electrical switch is grounded, a second terminal of the third electrical switch is connected to a control terminal of the fourth electrical switch, a first terminal of the fourth electrical switch is grounded, a second terminal of the fourth electrical switch is connected to a resistor, and the motherboard power supply connector is configured for converting the power good signal into a system activation signal using the third electrical switch and the fourth electrical switch and outputting a system boot up signal via a node between the second terminal of the fourth electrical switch and the resistor.

5. A motherboard, comprising:

a motherboard power supply connector configured for connecting a power supply unit, the motherboard power supply connector having a power supply on pin and a power good pin, the power good pin configured for receiving a power good signal from the power supply unit; and a time delay circuit having an input terminal configured for receiving a power supply on signal and an output terminal, the output terminal connected to the power supply on pin and configured for sending the power supply on signal to the power supply on pin after a time delay determined by the time delay circuit, the time delay circuit comprising a time delay chip and a first electrical switch, the time delay chip having an input pin configured for receiving the power supply on signal and an output pin connected to the power supply on pin, a control terminal of the first electrical switch connected to the output pin, a first terminal of the first electrical switch grounded, and a second terminal of the first electrical switch connected to the output terminal of the time delay circuit;

wherein the motherboard power supply connector comprises a second electrical switch, a control terminal of the second electrical switch is connected to the output terminal of the time delay circuit, a first terminal of the second electrical switch is grounded, and a second terminal of the second electrical switch is connected to the power supply on pin.

6. The motherboard of claim 5, wherein the motherboard power supply connector further comprises a third electrical switch and a fourth electrical switch, a control terminal of the third electrical switch is connected to the power good pin, a first terminal of the third electrical switch is grounded, a second terminal of the third electrical switch is connected to a control terminal of the fourth electrical switch, a first terminal of the fourth electrical switch is grounded, a second terminal of the fourth electrical switch is connected to a resistor, and the motherboard power supply connector is configured for converting the power good signal into a system activation signal using the third electrical switch and the fourth electrical switch and outputting a system boot up signal via a node between the second terminal of the fourth electrical switch and the resistor.

\* \* \* \* \*